Patented Aug. 5, 1924.

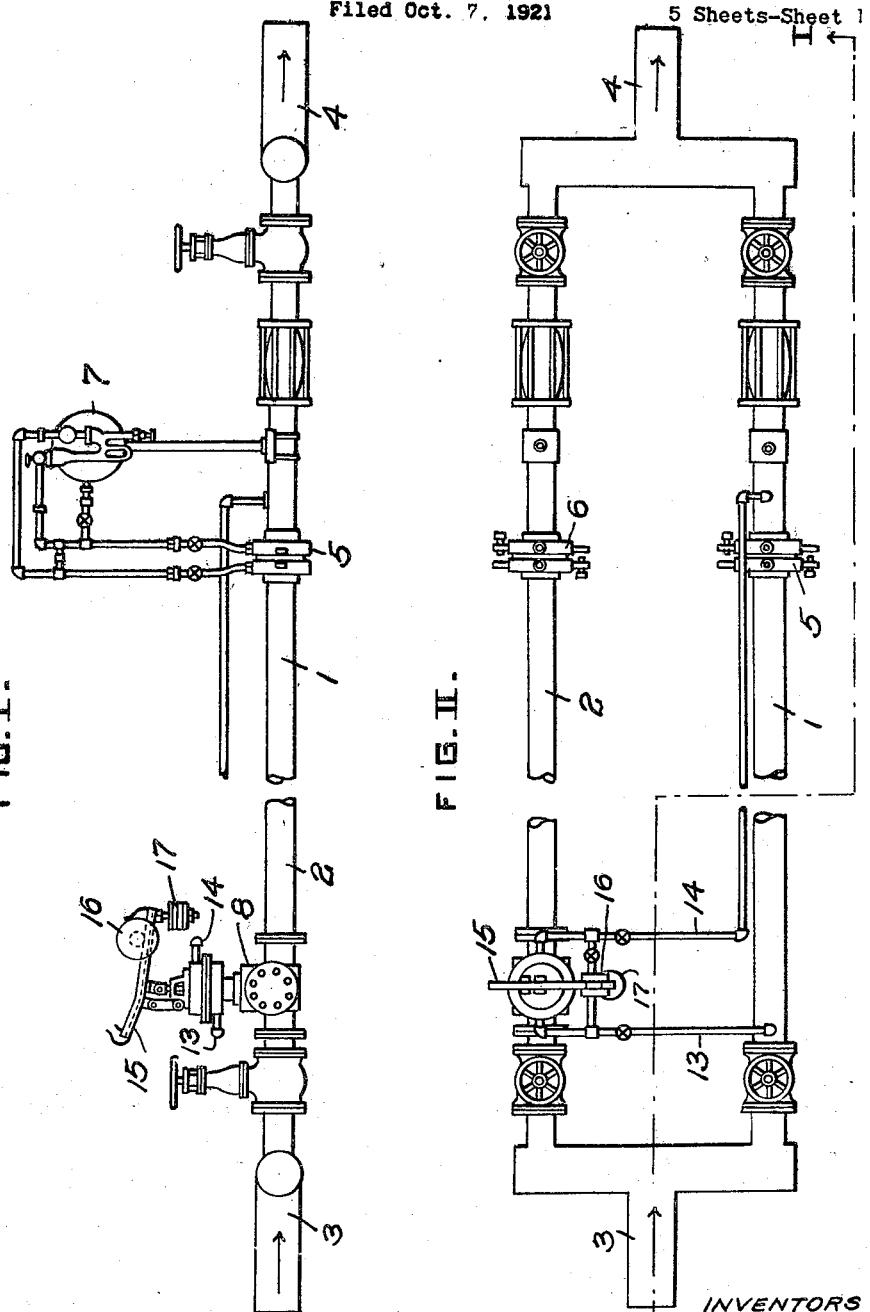

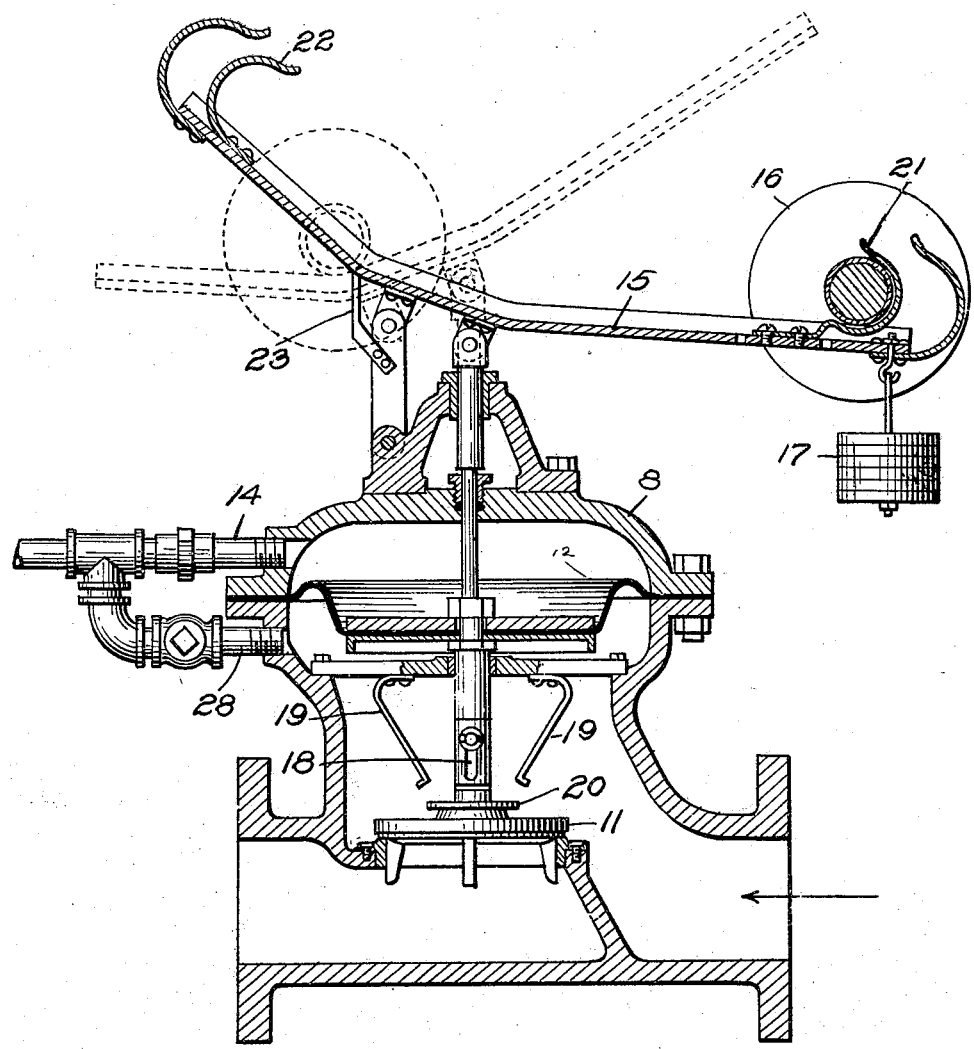

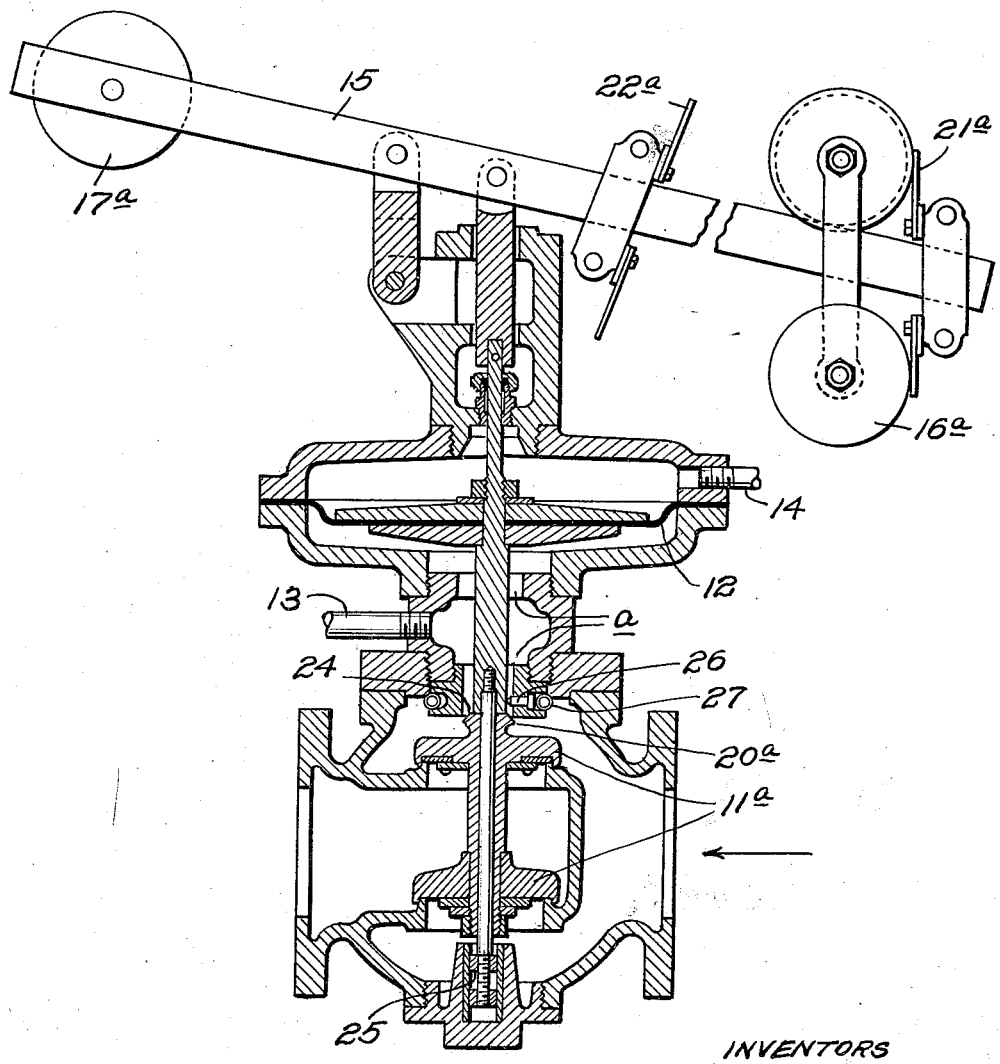

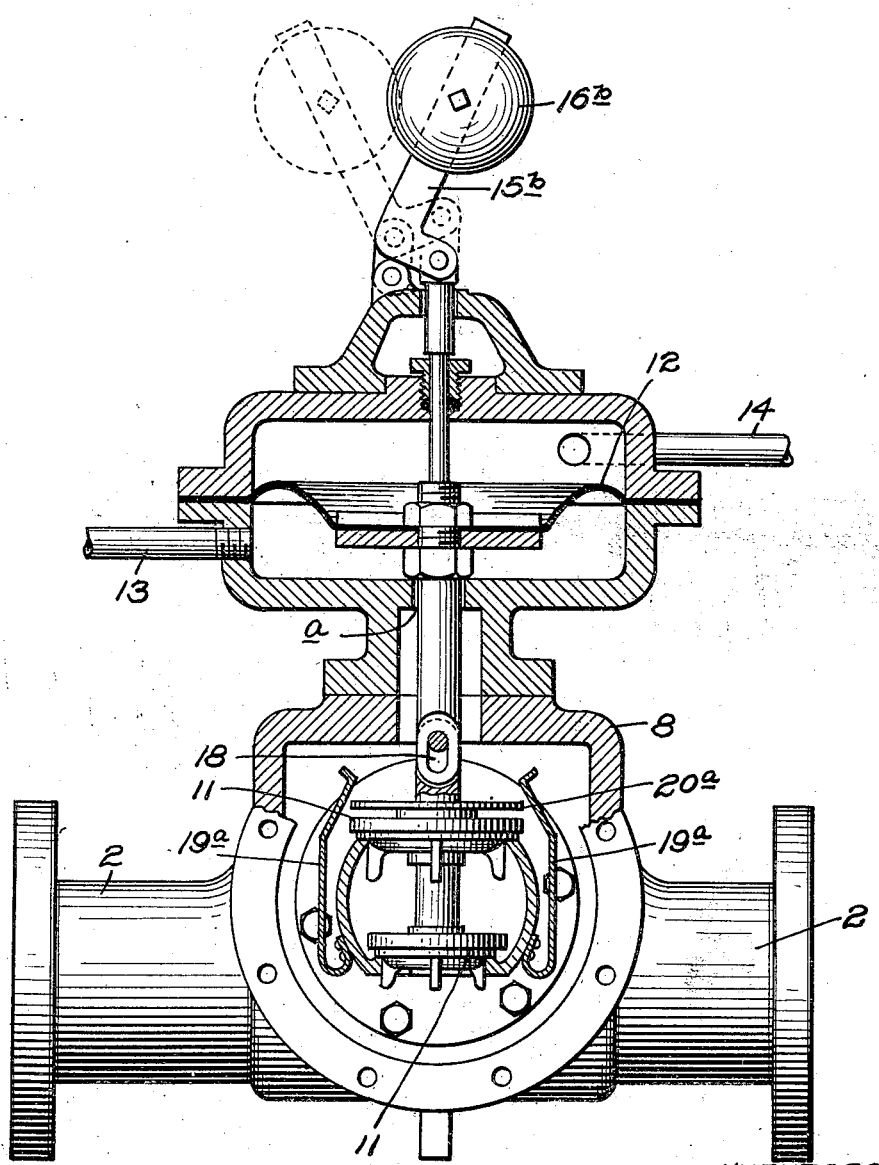

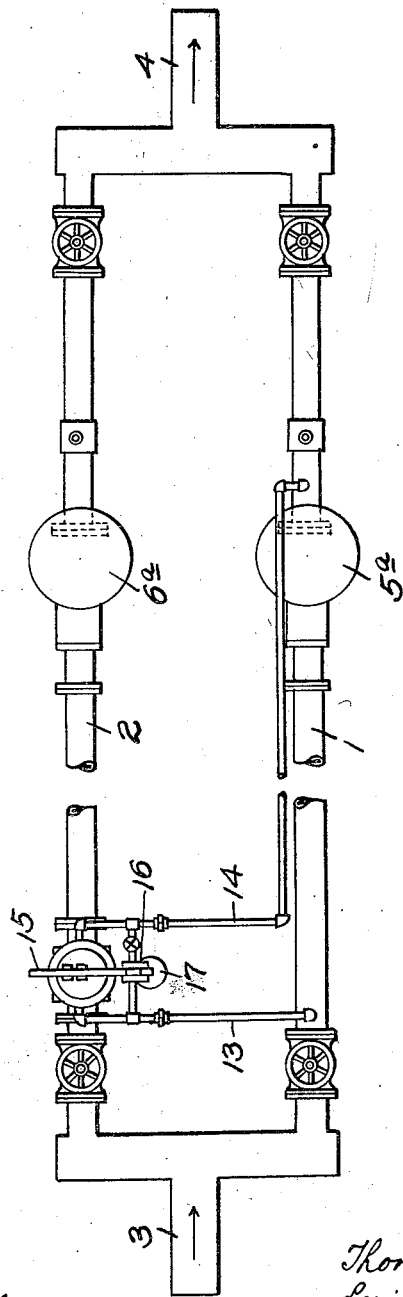

1,503,591

UNITED STATES PATENT OFFICE.

THOMAS H. KERR, OF COLUMBUS, OHIO, AND LEVI H. DUNCAN, OF BEN AVON, PENNSYLVANIA.

FLUID-SUPPLY SYSTEM.

Application filed October 7, 1921. Serial No. 506,037.

*To all whom it may concern:*

Be it known that we, THOMAS H. KERR, residing at Columbus, county of Franklin, and State of Ohio, and LEVI H. DUNCAN, residing at Ben Avon, in the county of Allegheny and State of Pennsylvania, both citizens of the United States, have invented or discovered certain new and useful Improvements in Fluid-Supply Systems, of which improvements the following is a specification.

Our invention relates to improvements in fluid-supply systems, and has particularly to do with the arrangement of and the consequent operation of ancillary apparatus, such as meters and regulators, which are automatically operated by the flowing fluid. Such an ancillary unit—a meter, for example—is necessarily of limited capacity; it will measure with substantial accuracy the fluid in a flowing stream, so long as the rate of flow does not fall below a certain minimum nor rise above a certain maximum. What shall be the actual value of these maximum and minimum limits is predetermined in the constructing of the particular instrument; the designer has some latitude in determining the limits; but, once he has determined them, they may not be changed.

The designer may not, however, fix these limits of maximum and minimum capacity freely and unconditionally, as he will; there are practical limitations under which he works; and, coming without further circumlocution to concrete statement, it is found, as a matter of practice in the measurement of gas, that the maximum capacity of a given instrument may not be much more than four and one half times as great as its minimum capacity. An instrument which is built to measure at a minimum gas flowing at a rate of 100,000 cubic feet a day, for example, may not be made to measure at a maximum a flow of more than 450,000 cubic feet a day.

The practical necessity often arises, of measuring a gas supply to a town, for example, or to an industrial plant, where the peak consumption so greatly exceeds the minimum, that no single measuring instrument can do the work. The difficulty is not with the minimum flow. That may easily be taken care of. The real difficulty lies in the proper measurement of the gas when the rate of consumption is at or near the peak. To meet this difficulty multiple-meter installations have been made.

What is here said of meters is true of regulators also, and is true of ancillary apparatus generally, operated by the flowing fluid. In the ensuing specification we shall dwell primarily on meter installation—that being a particular example of the applicability of our invention. We shall then in the sequel explain how the invention is equally applicable in the installation of other ancillary apparatus operated by the flowing fluid—as, for instance, regulators.

In a multiple-meter installation a plurality of measuring instruments is provided; one of these always is in service; and, co-operating with this one, a second instrument comes into play, taking a fraction of the stream, as the rate of flow approaches the capacity of the first instrument acting alone. In like manner a third instrument, and more, may be associated in such an installation.

Our invention is found in improved means for bringing these associated instruments successively into and out of play, according to need. This application is in part a continuation of an application filed by us May 14, 1921, Serial No. 469,673.

The invention is applicable to the measurement of fluids generally, and it is not limited to measuring instruments of any particular kind. With these obvious comments we shall describe our invention in application to the measurement of gas and to an installation which employs orifice meters.

In the accompanying drawings Figure I is a view, partly in side elevation, partly in section (on the plane indicated by the line I—I, Figure II), and Figure II is a view in plan, of an installation embodying our invention, for the measurement of natural gas. From Figure II the measuring instruments themselves, present in Figure I, are, for the sake of clearness, removed. Figures III, IV, and V are views to larger scale and in vertical section, showing in alternative form the automatically operated valve, by the opening and closing of which a second meter is brought into and cut out of service, according to need. It is in the structure of and operation of this valve that our invention resides. Figure VI is a view, otherwise corresponding to Figure II, but illustrating the application of our invention to the installation of gas regulating apparatus.

In the multiple-meter insallation of Figures I and II, a suitable manifold is provided, consisting of conduits 1 and 2, connected in parallel in the line of flow of gas through the main 3—4. In each branch of the manifold a meter is installed. In this instance it is the orifice meter which is chosen for purposes of illustration. The construction and operation of the orifice meter are sufficiently well known, and there is no need of minute description here. Suffice it to note that at 5 and 6 are indicated flange unions of familiar form, between the flange faces of which the usual orificed disks are clamped. One of the recording instruments (there is one for each conduit) is indicated at 7, supported on pipe 1, and connected in familiar manner, so as to be subject to pressure conditions existing on the opposite sides of the orifice. The form of measuring instrument here diagrammatically shown is that in which two records are traced on a single chart, one record being that of the differential pressure (the difference between the pressures obtaining on opposite sides of the orifice) and the other record being that of static pressure (the pressure on the down-stream side of the orifice compared with the substantially constant atmospheric pressure). Measuring instruments of other sorts are of course available to us; we have chosen the orifice-meter, to make exemplary showing merely.

One of the two branches 1 and 2 of the manifold is open always to the flow of gas; in the other a cut-off is arranged. Normally, the cut-off valve stands closed, and all the gas flows through the open branch. When, however, the rate of flow increases beyond a predetermined point, the cut-off in the other branch opens automatically, and thereupon the stream now divided begins to flow in part in the second branch. Each branch now carries a part of the whole, and two meters are operative, each measuring a part of the whole quantity of gas supplied. By such provision a rate of flow in excess of the capacity of a single instrument is taken care of by two instruments working each within the limits of its capacity.

In Figure I a valve casing 8 will be remarked, arranged in branch 2 of the manifold. Figure III is a view in vertical and medial section through such a valve casing, showing the cut-off valve with its operating parts. Minute comparison will reveal the fact that the valve casing shown in elevation in Figure I is not identically the valve casing of Figure III; but in the sequel it will appear that considerable latitude in details of construction is permissible. And in point of fact Figure I shows this valve casing in one of its permissible variants of form, and Figure III shows it in another variant; in both variants our invention is present.

The cut-off valve 11 is of suitable type, to control the flow of gas in the conduit. It will be remarked of the valve shown that, closing as it does in the direction of flow, it is when seated held to its seat by the gas pressure on the up-stream side. A fluid-pressure motor, conveniently in the form of a diaphragm 12 within a suitable chamber, is connected to the stem of valve 11. Diaphragm 12 is from beneath subjected to the pressure which obtains on the up-stream side of the orifice in conduit 1, and from above to the pressure on the down-stream side of the same orifice. Such communication of pressure is conveniently achieved by allowing the fluid under pressure on the up-stream side of valve 11, passing around the connecting stems, to gain access to the diaphragm chamber beneath the diaphragm and by opening a duct 14 from a convenient point in the line of flow of gas on the down-stream side of the orifice to the diaphragm chamber above the diaphragm. Reference to Figures I and II will show that, instead of depending on fluid-pressure communication around the connecting stems between valve and diaphragm, high pressure may be communicated to the space beneath the diaphragm through a duct 13 opening from the gas passageway at a convenient point on the up-stream side of the apparatus. Figure III shows additionally a valve-controlled by-pass 28 bringing the spaces above and below the diaphragm into communication one with another. Ordinarily, when gas flow is about to be established through the apparatus, this by-pass is open, and it then serves to protect the diaphragm from injury in consequence of any sudden great accession of pressure on one side alone. When normal conditions of flow have once been established, and before the apparatus begins to function in the measurement of gas, this by-pass is closed.

With attention immediately fixed on Figure III, we shall describe the details of construction. The pressure exerted on diaphragm 12 from above (the pressure on the down-stream side of the orifices) is supplemented by the weight of the diaphragm itself, and of the connected parts.

Means are provided, by virtue of which the valve, when it opens, opens immediately to the full; and, when it closes, closes completely. These means are found, in part in connection between diaphragm and valve admitting of lost motion definite in amount: in part in a yielding latch for the valve when in open position; and, finally, in a counterweight for the diaphragm having certain characteristics.

The loose connection between diaphragm and valve may conveniently take the pin and slot form, as shown at 18; the yielding latch for the valve when brought to wide-open position may take the form of spring arms 19 adapted to yield as the valve rises and then to make engagement at their extremities beneath a collar 20 made integral with the valve. The counterweight requires more minute description.

It should first be remarked that the valve seat is preferably disposed in horizontal plane; the valve moves vertically, and opens by upward movement; the diaphragm also extends in horizontal plane and is conveniently arranged concentrically above the valve; the connection between diaphragm and valve is (with the lost-motion provision already described) direct. These conditions of preferred arrangement are not limitations; but, given these conditions, the parts which we are about to describe may be arranged in simplest manner.

A beam 15, linked to a stationary support, extends from such fulcrum point with opposite arms. One arm (the arm to the right, Fig. III) overhangs diaphragm 12, and to it at an intermediate point, a point adjacent the fulcrum point, the stem of the diaphragm is pivoted.

The counterweight is in this instance made up of two components: a weight 17 hung immovable at the extremity of the arm to the right, and a weight 16 movable by gravity along the beam. Weight 17 may, as the drawing suggests, be of variable and predetermined value.

The swinging beam 15 does not in any position depart widely from the horizontal, but within its range its inclination changes and reverses, and, accordingly, weight 16 rolls along it, impelled by gravity. The particular shape of the beam is a matter to which our invention in its broader aspect is not limited, but we call attention to these features: the opposite arms extend angularly one to the other; they meet near the fulcrum point, not abruptly, but in a portion of intermediate angularity; the arms at their extremities are provided with elastic and cushioning stops 21, 22, for weight 16; and at a point adjacent but at an interval from the fulcrum is a stop 23 which as the beam swings projects sufficiently when the beam is in a certain position to arrest the moving weight 16.

Operation will readily be understood. Fig. III shows the parts in normal position, with the cut-off valve 11 closed; the figure also shows, in dotted lines, the beam 15 and the movable weight 16 in the position assumed when the diaphragm has risen and the valve has opened to wide-open position.

When the parts are in the position shown in full lines in Fig. III, valve 11 is held to its seat by pressure on the up-stream side, while diaphragm 12 is held depressed under these forces: (1) the pressure of the gas on the down-stream side of the apparatus, exerted upon the upper surface of the diaphragm, (2) the gravity of the combined weights 16 and 17, exerted through beam 15 upon the diaphragm. Against these, (3) the pressure of the gas on the up-stream side of the apparatus, exerted upon the diaphragm from below tends to raise it. The parts are so proportioned that, as the rate of flow increases, the force tending to raise the diaphragm and presently to unseat valve 11 (which normally is less in amount than the sum of the opposing forces) increases until it exceeds the sum of the forces tending to hold the valve to its seat. And this point is reached when the rate of flow is approaching the maximum capacity of the measuring apparatus in conduit 1.

The diaphragm in response to such overbalancing of forces begins to rise. It does not immediately begin to lift valve 11; but, because of the pin-and-link connection 18, it moves independently of the valve, through a preliminary portion of its range of movement. During this preliminary movement beam 15 swings, and the right arm which theretofore had been downwardly and outwardly inclined is brought to reversed inclination. Immediately weight 16 moves from its terminal position at the right to the extreme end of the left arm of the beam. This occurs just before the lost motion in the connection between diaphragm and valve has been fully taken up.

The immediate effect of the shift of weight 16 from one terminal position to the other on beam 15 is to give to the diaphragm-raising forces sudden relatively great preponderance over the opposing forces, and immediately valve 11 is carried from its seat to the extreme limit of upward movement. When the opening of the valve has been so accomplished the weight 16, which under momentum has rolled from one end of the beam to the other now returns to a medial position, where it rests, checked by stop 23.

The valve when opened is secured by latch 19, 20.

When the valve is open the stream of gas is divided and measuring is accomplished by two instruments working each well within the limits of its capacity.

Once opened, the valve continues open until the rate of flow falls well within the capacity of a single instrument alone.

When however the rate of flow has so fallen, the movement of parts progresses in reverse sequence; diaphragm 12 begins its descent, and, by virtue of the lost motion in the connection between the diaphragm and valve 11 and by virtue also of the latch which sustains the valve, the diaphragm moves through an initial portion of its downward stroke without moving the valve. During this initial movement the inclination of the right arm of beam 15 (which had been inward and downward) is reversed and weight 16 is raised above stop 23 and moves from medial position to its extreme position at the end of the right arm of beam 15. This occurs just before the lost motion in the valve connection is entirely taken up. Immediately, there is a sudden and great preponderance of diaphragm-depressing forces. The lost motion in the valve connection is wholly taken up, the spring arms 19 of the latch yield, the diaphragm is carried to the lower limit of its range, and valve 11 is closed.

Regarding the beam, with its fixed and movable weights, its refinements of shape, and its terminal and medial stops, as a unit, it may be characterized as a counterweight structure whose effect upon diaphragm 12 is that of a weight of a value diminishing as the diaphragm rises, increasing as the diaphragm descends. Ordinarily the actual value of weight 16 so far exceeds weight 17 that the effect upon diaphragm 12 is not merely of a weight of diminishing value, opposing diaphragm rise; it is in effect a force which, initially exerted in opposition to diaphragm rise, diminishes to zero, and then, exerted in assistance of diaphragm rise, increases from zero to a certain amount—and alternately progresses through these phases in reverse order.

Turning from Fig. III to Fig. IV, certain variations in detail are to be noted. The lost motion in the connection between diaphragm 12 and valve $11^a$ is here provided for by so mounting the valve that it will slide on its stem between a shoulder 24 above and a nut (which may be adjustable) 25 below. The latch for the valve takes the form of a pin 26 with opposite inclined upper and lower faces, held forward by a spring 27, and co-operating with a correspondingly bevelled collar $20^a$ integral with the value itself. The beam $15^a$ is provided with a weight $17^a$ fixed at the extremity of one of its opposite arms, and with a weight $16^a$ movable along the other arm as inclination changes, but not movable across the fulcrum point. Spring stops $21^a$, 22 limit the range of movement of weight $16^a$. These differences in structure, do not alter the essential features of operation, already described.

Two features peculiar to the valve mechanism of Fig. IV, as distinguished from that of Fig. III are to be noted: (1) while pressure of the gas on the up-stream side of the apparatus gains access to the diaphragm chamber on the nether side of the diaphragm through passageways $a$, $a$ surrounding the stems of valve and diaphragm, and while this line of communication renders duct 13 really unnecessary, still as the drawing shows this duct may still be retained. (2) The feature remaining to be noted is that the valve $11^a$ is in this case a balanced valve. To this feature attention will presently be again directed.

In Fig. V the connection between diaphragm and valve is again that of Fig. III. The latch for the valve too is essentially that of Fig. III. A beam for carrying the counterweight is dispensed with. Instead, a bell-crank lever $15^b$ is fulcrumed by link connection to a fixed support (the valve casing). To the short arm of this bell-crank lever the diaphragm stem is pivoted; to the long arm a weight $16^b$ is rigidly secured. The parts are so arranged that in the range of rise and fall of diaphragm 12, the long arm of bell-crank lever $15^b$ swings across the vertical from side to side. In the full-line position shown in Fig. V the weight $16^b$ is exerted upon the diaphragm, tending to depress it; in the alternative dotted-line position, the weight is exerted on the diaphragm, tending to raise it. With these comments operation will be understood from what has been said of the form of Fig. III.

Some general observations remain to be made. The particular form of valve shown in Fig. III is that of a single, simple lift valve, in the use of which the difference of pressure obtaining on opposite sides of the valve is enjoyed to the full, to hold the valve when closed to its seat. The valve as shown in Fig. IV is a balanced valve, and in this case the valve itself is free of any effect of pressure exerted directly upon it, but is responsive to control by the diaphragm. The valve of Fig. V is of balanced type, but the balancing is incomplete, so that when seated the difference in pressure upon its opposite sides, modified in magnitude of effect by the structure of the valve itself, tends to hold the valve to its seat. In this respect and so far as concerns the invention in its broader aspect the valve may be of whatever sort is preferred; the diaphragm-moving parts will be proportioned accordingly.

The single and unbalanced valve structure of Fig. III, however, when combined with the valve-operating mechanism, affords an instrument of greatest precision, and this particular combination involves a matter of specific invention. When the valve is a single valve such as that shown in Fig. III, valve and diaphragm at the time of raising are subject to pressure which exerted oppositely upon them is in effect substantially cancelled. Accordingly when in the range of diaphragm rise the lost motion is taken up, so far as concerns further rise, valve and diaphragm are one, and when simultaneously at this instant the movable weight automatically traverses lever 15 from the right arm as seen in Fig. III across the fulcrum and to the left arm, certainty of operation is assured. It is necessary that there be a complete reversal of the moment of force of the movable weight with respect to the position of the valve, in order to effect valve opening. In short, the fact that the valve is single assures the prompt and proper shifting to the fullest and effective extent of the movable weight. The result is that the intended functioning of the device is assured in a degree not otherwise realized.

We have described our invention applied to a manifold of two conduits; manifestly it is applicable to bring successively into service, not a second conduit only, but, in sequence, a third and more.

We have already said that the particular kind of measuring instrument may be such as is preferred.

We have described the connection of the beam in its several forms (or the equivalent bell crank lever) to the diaphragm casing and to the diaphragm itself such as to accommodate the right-line motion of the diaphragm stem and the pivotal motion of beam (or bell crank lever) the one to the other. The beam (or the equivalent bell crank lever) is pivoted directly to one of the two members which it engages, and is linked to the other. It is this linking of the beam (or bell crank lever) to one of the two connecting parts that makes this accommodation possible. We have in fact shown this part linked to the stationary part of the structure and directly pivoted to the stem of the diaphragm. This is our preferred arrangement, but it will suffice that there be such interconnection of parts as to permit of this accommodation of the two movements the one to the other.

Manifestly the invention is applicable to the conduction of fluids generally, and the particular description here given of the measurement of gas is merely exemplary.

As for the cut-off mechanism, we have been careful to show variations of structure, and this variant showing will serve to indicate that we are not limited to mechanical details; we intend that an engineer following our teaching shall make adaptations, as conditions of service may require and the common knowledge of the art may suggest.

Having now fully described our invention in its application to the measurement of flowing fluid, it remains to indicate that the invention is of wider and general applicability—that it is applicable indeed wherever ancillary apparatus operated by the flowing fluid is installed. To make this plain we have in Figure VI of the drawings illustrated a portion of a gas-supply system wherein the arrangement of and operation of pressure-regulating apparatus, rather than measuring apparatus, is illustrated.

We have explained that in consequence of practical limitations no single measuring instrument can be built to serve efficiently under the widely varying conditions of fluid supply which life and industry require. The same observation applies to regulators—apparatus by which the pressure of gas in service lines is kept within predetermined limits, even though those limits be exceeded at the source of supply.

With these general observations, reference to Figure VI and comparison of it with Fig. II will reveal the fact that the arrangement is identically the same, with the substitution of regulators diagrammatically indicated at 5$^a$ and 6$^a$ in place of the measuring apparatus of which part is shown in Fig. II and indicated by the numerals 5 and 6. Regulators are well known units of apparatus, and require no minute showing here; suffice it to say that the purpose and effect of a regulator is to establish in the delivery pipe a relatively low and constant pressure, in spite of a relatively high and fluctuating pressure existing in the supply pipe. Accordingly the pressure existing on opposite sides of regulator 5$^a$ being communicated to opposite sides of the diaphragm 12 of the cut-out apparatus (cf. Fig. III), conditions are established, under which the cut-out apparatus will function in the manner already described: when gas pressure on the supply side of regulator 5$^a$ exceeds a predetermined maximum value, valve 11 will automatically open and the second branch 2 of the manifold will be brought into service; the stream of gas supply will be divided, and in each branch a regulator will be functioning, and the desired regulation of the whole achieved; and this by instruments, neither one of which alone has capacity to regulate the entire flow.

We claim as our invention:

1. In a fluid-supply system a plurality of fluid conduits arranged in parallel, a cut-off valve arranged in one of said conduits and closing in the direction of flow to cut off flow through that conduit, a fluid-pressure element to which said valve is connected in a union admitting of a limited amount of lost motion, said fluid-pressure element being subjected to up-stream pressure in valve-opening direction and to down-stream pressure in valve-closing direction, a weight operative upon the fluid-pressure element when the valve is closed and tending to hold the fluid-pressure element against valve-opening movement, and means for relieving the fluid-pressure element of said weight when the fluid-pressure element moves in valve-opening direction.

2. In a fluid-supply system a plurality of fluid conduits arranged in parallel, a cut-off valve arranged in one of said conduits movable vertically and closing downwardly and in the direction of flow to cut off flow through the conduit, a fluid-pressure element, movable vertically, to which said valve is connected in a union admitting of a limited amount of lost motion, said fluid-pressure element being subjected from beneath to up-stream pressure and from above to down-stream pressure, a weight adapted to exert its downward influence upon the fluid-pressure element when that element is depressed and means for relieving the said fluid-pressure element in rising from the effect of said weight.

3. In a fluid-supply system, a plurality of fluid conduits arranged in parallel, a cut-off valve arranged in one of said conduits, a fluid-pressure element to which said valve is operatively connected and which is itself subject to the varying conditions of pressure obtaining in another of said conduits, a beam mounted for pivotal movement and extending from its fulcrum point in opposite arms inclined one to another at an upwardly spreading angle of less than 180°, said beam being pivotally connected by one arm at a point intermediate the length thereof to said fluid-pressure element, and a weight movable under gravity longitudinally of said beam and from one arm thereof to the other, as the latter swings in response to movement of said fluid-pressure element.

4. In a fluid-supply system, a plurality of fluid conduits arranged in parallel, ancillary apparatus adapted to be operated by the flowing fluid arranged in each conduit, a cut-off valve arranged in one of said conduits, a fluid-pressure element to which said valve is connected by a union admitting of a limited amount of lost motion, the fluid-pressure element being itself subject to the varying conditions of pressure obtaining in another of said conduits, a weight structure connected to said fluid-pressure element and including a member movable under gravity as said fluid-pressure element moves, the said weight structure within its range of normal movement exerting upon said fluid-pressure element oppositely directed valve-closing and valve-opening tendencies, and means adapted to yield under the superior force for retaining said valve in open position during a preliminary traverse of said fluid-pressure element from its extreme valve-opening position.

5. In a fluid-supply system a plurality of fluid conduits arranged in parallel, a cut-off valve arranged in one of said conduits, a fluid pressure-element to which said valve is connected and itself subjected to up-stream and down-stream pressures oppositely exerted upon it, a swinging beam whose opposite arms are inclined one to another at an upwardly spreading angle of less than 180° and between whose opposite arms extends a surface of intermediate inclination, said beam being articulated to said pressure element, and a weight adapted to move in response to gravity upon said beam.

6. In a fluid-supply system, a plurality of fluid conduits arranged in parallel, ancillary apparatus adapted to be operated by the flowing fluid arranged in each conduit, a cut-off valve arranged in one of said conduits, a fluid-pressure element with connection to said valve subject to varying conditions of pressure obtaining in another of said conduits, a beam with upwardly directed angularly disposed arms fulcrumed intermediate its length, and a weight movable under gravity along said beam as it swings, said fluid-pressure element being articulated to said beam at a point intermediate the length of one of said arms and in a joint admitting of pivotal movement and by its motion effecting the swinging thereof.

7. In a fluid-supply system, a plurality of fluid conduits arranged in parallel, ancillary apparatus adapted to be operated by the flowing fluid arranged in each conduit, a cut-off valve arranged in one of said conduits, a fluid-pressure element with connection to said valve subject to varying conditions of pressure obtaining in another of said conduits, a beam with angularly disposed arms fulcrumed intermediate its length and articulated with said fluid-pressure element, a weight movable under gravity along said beam as it swings, and a stop arranged at an interval from the fulcrum point of the beam and becoming effective and ineffective to block the advance of the weight according to the position of the beam as it swings upon its pivot.

8. In a fluid-supply system a plurality of fluid conduits arranged in parallel, a cut-off valve of single type arranged in one of said conduits and closing in the direction of flow to cut off the flow through that conduit, a fluid-pressure element to which said valve is connected in a union admitting of a limited amount of lost motion, said fluid-pressure element being subjected to upstream pressure in valve-opening direction and to down-stream pressure in valve-closing direction, a weight operative upon the fluid-pressure element when the valve is closed and tending to hold the fluid-pressure element against valve-opening movement, and means for relieving the fluid-pressure element of said weight as the fluid-pressure element moves in valve-opening direction.

In testimony whereof we have hereunto set our hands.

THOMAS H. KERR.

Witnesses to signature of Thomas H. Kerr:
H. H. SMITH,
M. E. REINHARD.

LEVI H. DUNCAN.

Witnesses to signature of Levi H. Duncan:
FRANCIS J. TOMASSON,
HARRY E. VANDERSYDE.